United States Patent
Kakishima et al.

(10) Patent No.: US 8,891,478 B2
(45) Date of Patent: Nov. 18, 2014

(54) MOBILE TERMINAL APPARATUS AND RADIO COMMUNICATION METHOD

(75) Inventors: Yuichi Kakishima, Tokyo (JP); Hidekazu Taoka, Tokyo (JP); Katsutoshi Kusume, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/816,812

(22) PCT Filed: Aug. 11, 2011

(86) PCT No.: PCT/JP2011/068398
§ 371 (c)(1),
(2), (4) Date: Mar. 26, 2013

(87) PCT Pub. No.: WO2012/023500
PCT Pub. Date: Feb. 23, 2012

(65) Prior Publication Data
US 2013/0182672 A1    Jul. 18, 2013

(30) Foreign Application Priority Data
Aug. 16, 2010    (JP) .................... 2010-181789

(51) Int. Cl.
*H04W 4/00*    (2009.01)
*H04L 5/00*    (2006.01)
*H04B 7/04*    (2006.01)
*H04L 25/02*    (2006.01)
*H04L 25/03*    (2006.01)
*H04B 7/06*    (2006.01)
*H04W 16/28*    (2009.01)
*H04W 24/10*    (2009.01)

(52) U.S. Cl.
CPC .... *H04B 7/0417* (2013.01); *H04L 2025/03808* (2013.01); *H04L 5/0053* (2013.01); *H04L 25/03949* (2013.01); *H04B 7/0639* (2013.01); *H04B 7/065* (2013.01); *H04W 16/28* (2013.01); *H04L 25/0204* (2013.01); *H04L 2025/03426* (2013.01); *H04B 7/0452* (2013.01); *H04B 7/066* (2013.01); *H04B 7/063* (2013.01); *H04W 24/10* (2013.01)
USPC ........................................................ 370/329

(58) Field of Classification Search
USPC ........................................................ 370/329
See application file for complete search history.

(56) References Cited

U.S. PATENT DOCUMENTS

2011/0141941 A1* 6/2011 Lee et al. .................. 370/252
2012/0218968 A1* 8/2012 Kim et al. .................. 370/329
(Continued)

OTHER PUBLICATIONS

Notification of Reasons for Rejection in corresponding Japanese application No. 2010-181789 dated May 21, 2013 (4 pages).
(Continued)

*Primary Examiner* — Clemence Han
(74) *Attorney, Agent, or Firm* — Osha Liang LLP

(57) ABSTRACT

The present invention provides a mobile terminal apparatus and a radio communication method which can feed back precoders that are essential to generate precoding weights in downlink MIMO transmission. With the present invention, in the first mode to feed back subband second PMIs that are selected per bandwidth part through a physical uplink control channel, a subband second PMI and a wideband second PMI are selected from a second codebook, the subband second PMI and the wideband second PMI are multiplexed on a subframe, and the multiplex signals is transmitted to a radio base station apparatus through the above physical uplink control channel.

13 Claims, 9 Drawing Sheets

(56) References Cited

U.S. PATENT DOCUMENTS

| | | | | |
|---|---|---|---|---|
| 2012/0320862 A1* | 12/2012 | Ko et al. | ......... | 370/329 |
| 2013/0028225 A1* | 1/2013 | Ko et al. | ......... | 370/329 |
| 2013/0058295 A1* | 3/2013 | Ko et al. | ......... | 370/329 |
| 2013/0058307 A1* | 3/2013 | Kim et al. | ......... | 370/329 |

OTHER PUBLICATIONS

Samsung; "Views on the feedback framework for Rel. 10"; 3GPP TSG RAN WG1 Meeting #61, R1-103377; Montreal, Canada; May 10-14, 2010 (17 pages).

Decision to Grant a Patent issued in corresponding Japanese Application No. 2010-181789, mailed Aug. 20, 2013 (4 pages).

International Search Report issued in PCT/JP2011/068398 mailed Sep. 13, 2011 (4 pages).

3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8)"; Dec. 2008 (18 pages).

Alcatel-Lucent et al., "CQI/PMI reporting modes on PUCCH for two-stage feedback", 3GPP TSG RAN WG1 Meeting #62, Tdoc R1-104397, Madrid, Spain; Aug. 23-27, 2010 (4 pages).

NTT DoCoMo, "Views on CSI Feedback Signaling on PUSCH/PUCCH", 3GPP TSG RAN WG1 Meeting #62, R1-104934, Madrid, Spain; Aug. 23-27, 2010 (7 pages).

3GPP TS 36.213 V9.2.0; "3rd Generation Partnership Project; Technical Specification Group Radio Access Network; Evolved Universal Terrestrial Radio Access (E-UTRA); Physical layer procedures (Release 9)"; Jun. 2010 (80 pages).

Written Opinion w/translation from PCT/JP2011/068398 mailed on Sep. 13, 2011 (6 pages).

International Preliminary Report on Patentability w/translation from PCT/JP2011/068398 mailed on Mar. 19, 2013 (8 pages).

ZTE, "Considerations on signaling for Two-component Feedback," 3GPP TSG RAN WG1 Meeting #60bis; R1-104196; Dresden, Germany, Jun. 28-Jul. 2, 2010 (12 pages).

Samsung, "Control signaling to support Rel. 10 feedback framework," 3GPP TSG RAN WG1 Meeting #61bis; R1-103667; Dresden, Germany, Jun. 28-Jul. 2, 2010; (13 pages).

NTT DoCoMo, "Further Views on CSI Feedback for LTE-Advanced," 3GPP TSG RAN WG1 Meeting #61; R1-103258; Montreal, Canada, May 10-14, 2010; (5 pages).

* cited by examiner

| SYSTEM BW [RBs] | SUBBAND SIZE k [RBs] | NUMBER OF BANDWIDTH PARTS(BP) | NUMBER OF BEST REPORTED SUBBANDS(M) OUT OF (N) | NO. LABEL BITS FOR EACH BP | TOTAL NO. CQI BITS PER FREQUENCY-SELECTIVE PUCCH REPORT |
|---|---|---|---|---|---|
| 6 – 7 | – | N/A | N/A | N/A | N/A |
| 8 – 10 | 4 | 1 | M=1, 2 <= N <= 3 | 1 or 2 | 5 OR 6(RANK 1) 8 OR 9(RANK 2 OR HIGHER) |
| 11 – 26 | 4 | 2 | M=1, 2 <= N <= 4 | 1 or 2 | 5 OR 6(RANK 1) 8 OR 9(RANK 2 OR HIGHER) |
| 27 – 63 | 6 | 3 | M=1, 2 <= N <= 4 | 1 or 2 | 5 OR 6(RANK 1) 8 OR 9(RANK 2 OR HIGHER) |
| 64 – 110 | 8 | 4 | M=1, 2 <= N <= 4 | 2 | 6(RANK 1) 9(RANK 2 OR HIGHER) |

FIRST MODE

SECOND MODE

WB CQI + WB W2

RI + WB W1

SB CQI + SB W2

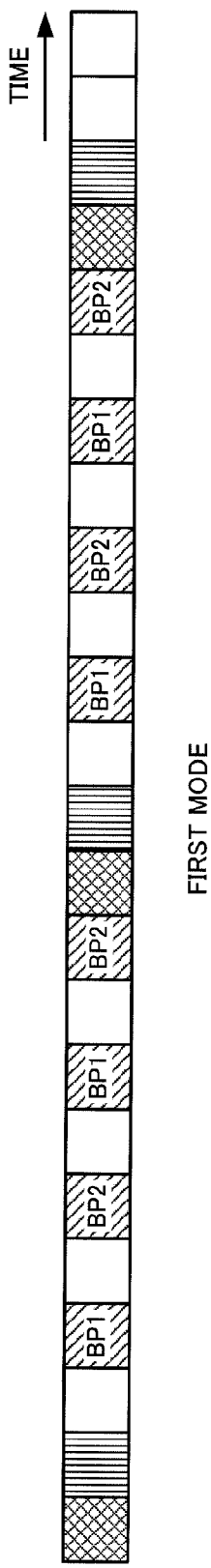
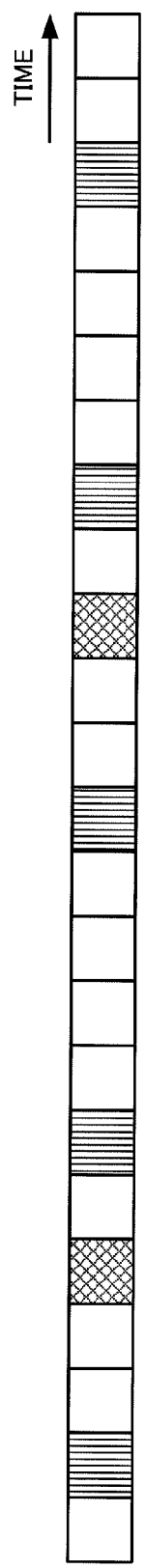
FIG.6A  FIRST MODE
FIG.6B  SECOND MODE
WB CQI + WB W1 + WB W2
RI
SB CQI + SB W2

MOBILE TERMINAL APPARATUS AND RADIO COMMUNICATION METHOD

TECHNICAL FIELD

The present invention relates to a mobile terminal apparatus and a radio communication method. More particularly, the present invention relates to a mobile terminal apparatus and a radio communication method which support multi-antenna transmission.

BACKGROUND ART

In a UMTS (Universal Mobile Telecommunications System) network, for the purposes of improving spectral efficiency and improving data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing high-speed data rates, providing low delay and so on, Long Term Evolution (LTE) has been under study.

In the third-generation mobile communication system, it is possible to achieve a transmission rate of maximum approximately 2 Mbps on the downlink by using a fixed band of approximately 5 MHz. Meanwhile, in the LTE system, it is possible to achieve a transmission rate of about maximum 300 Mbps on the downlink and about 75 Mbps on the uplink by using a variable bandwidth from 1.4 MHz to 20 MHz. Furthermore, in the UMTS network, for the purpose of achieving further broadbandization and higher speed, successor systems to LTE have been under study (for example, LTE Advanced (LTE-A)). For example, in LTE-A, there is a plan to expand the maximum system band of the LTE specifications, which is 20 MHz, to approximately 100 MHz. Also, the maximum number of transmitting antennas according to the LTE specifications is planned to be expanded from four antennas to eight antennas.

Also, in a system of the LTE scheme, a MIMO (Multi Input Multi Output) system is proposed (see, for example, non-patent literature 1), as a radio communication technique to transmit and receive data by a plurality of antennas and improve the data rate (spectral efficiency). In the MIMO system, a plurality of transmitting/receiving antennas are provided in the transmitter/receiver, so that different transmission information sequences are transmitted at the same time from different transmitting antennas. On the other hand, on the receiver side, taking advantage of the fact that fading variation is produced between the transmitting/receiving antennas, by separating and detecting the information sequences that have been transmitted at the same time, it is possible to increase the data rate (spectral efficiency).

In a system of the LTE scheme, single-user MIMO (SU-MIMO), in which all the transmission information sequences that are transmitted from different transmitting antennas are directed to the same user, and multiple-user MIMO (MU-MIMO), in which transmission information sequences that are transmitted from different transmitting antennas are directed to different users, are defined. In these SU-MIMO transmission and MU-MIMO transmission, on the receiver side, an optimal PMI is selected from a codebook, in which a plurality of sets of an amount of phase/amplitude control to be set in the antennas of the transmitter (precoding matrix (precoding weight)) and a PMI (Precoding Matrix Indicator) to be associated with the precoding matrix, are defined, per rank, and fed back to the transmitter, and, furthermore, an RI (Rank Indicator) to indicate an optimal rank are selected fed back to the transmitter. On the transmitter side, based on the PMI and RI fed back from the receiver, the precoding weight for each transmitting antenna is specified, precoding is performed, and transmission information sequence is transmitted.

CITATION LIST

Non-Patent Literature

Non-Patent Literature 1: 3GPP TR 25.913 "Requirements for Evolved UTRA and Evolved UTRAN"

SUMMARY OF INVENTION

Technical Problem

LTE-A is designed such that a mobile terminal apparatus feeds back a PMI, and the precoders which the mobile terminal apparatus selects are generated by what is selected from two codebooks, W1 and W2. Further discussion is required as to how to feed back such precoders selected from the two codebooks W1 and W2.

The present invention is made in view of the above points, and it is therefore an object of the present invention to provide a mobile terminal apparatus and a radio communication method which can feed back precoders that are essential to generate precoding weights, in downlink MIMO transmission.

Solution to Problem

A mobile terminal apparatus according to the present invention has a PMI selection section configured to, in a first mode to feed back a subband second PMI that is selected in each bandwidth part, through a physical uplink control channel, select the subband second PMI and a wideband second PMI from a second codebook, a multiplexing section configured to multiplexe the subband second PMI and the wideband second PMI on subframes, and a transmission section configured to transmit a multiplex signal to a radio base station apparatus through the physical uplink control channel.

A radio communication method according to the present invention has the steps of: at a mobile terminal apparatus: in a first mode to feed back a subband second PMI that is selected in each bandwidth part, through a physical uplink control channel, selecting the subband second PMI and a wideband second PMI from a second codebook; multiplexing the subband second PMI and the wideband second PMI on subframes; and transmitting a multiplex signal to a radio base station apparatus through the physical uplink control channel; and at the radio base station apparatus: receiving an uplink signal including the wideband second PMI and the subband second PMI; generating a precoding weight using the wideband second PMI and the subband second PMI; and forming a beam using the precoding weight and transmitting a downlink signal to the mobile terminal apparatus.

Advantageous Effects of Invention

According to the present invention, in the first mode, in which a subband second PMI that is selected each bandwidth part is fed back through a physical uplink control channel, a subband second PMI and a wideband second PMI are selected from a second codebook, the subband second PMI and the wideband second PMI are multiplexed on subframes, and the multiplex signal is transmitted to a radio base station apparatus through the above physical uplink control channel, so that it is possible to feed back the precoders that are essential to generate precoding weights in downlink MIMO transmission.

BRIEF DESCRIPTION OF DRAWINGS

FIG. 6A and FIG. 6B are each a diagram for explaining example 2 in a mobile terminal apparatus according to the present invention;

DESCRIPTION OF EMBODIMENTS

Figure 1:
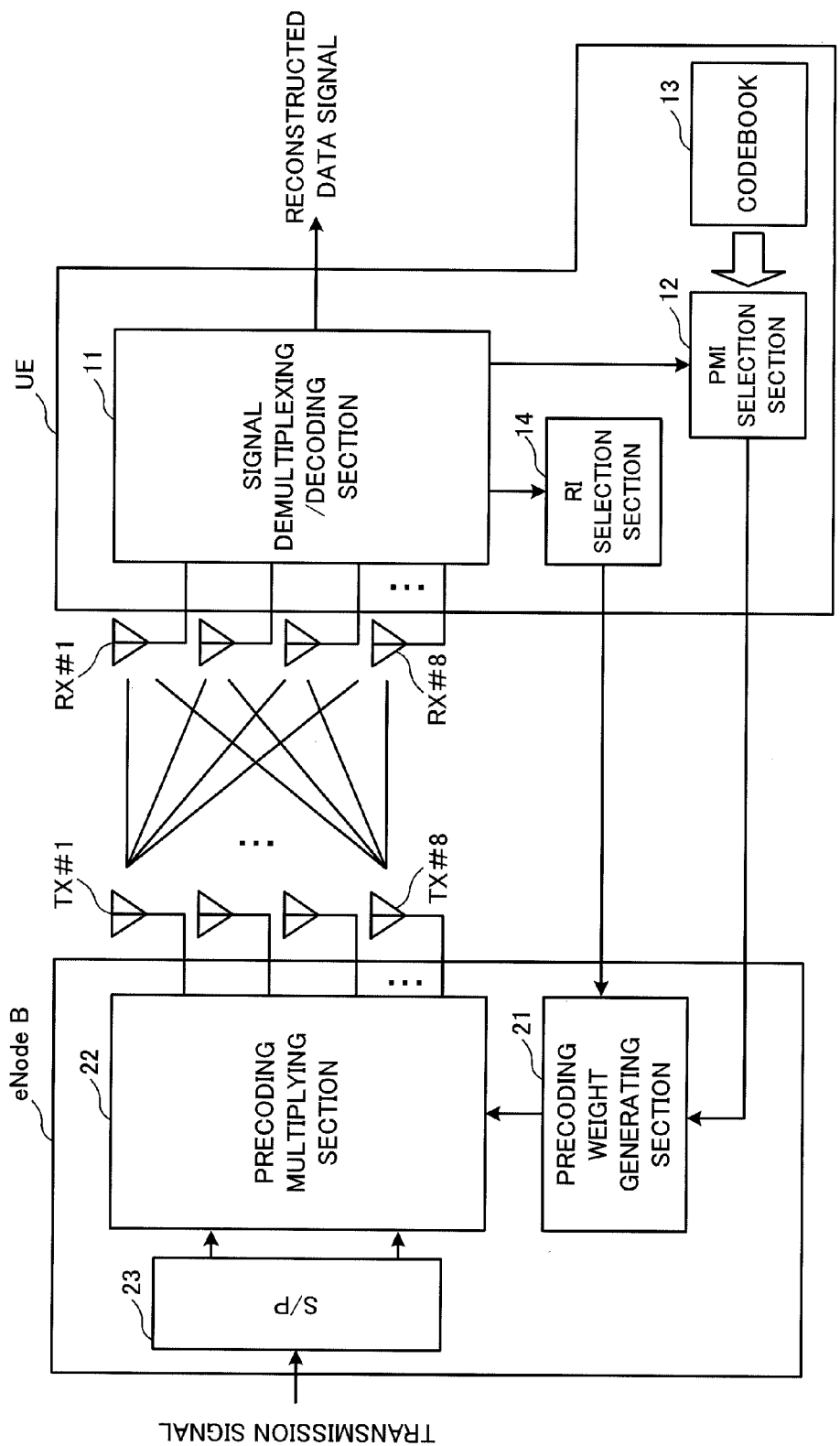
FIG. 1 is a conceptual diagram of a MIMO system adopting a communication control method according to the present invention.

Now, an embodiment of the present invention will be described below in detail with reference to the accompanying drawings. First, precoding in downlink MIMO transmission that is carried out in the LTE-A system will be described based on the premise of the MIMO system shown in FIG. 1. FIG. 1 is a conceptual diagram of a MIMO system adopting the communication control method according to the present invention. Note that the MIMO system shown in FIG. 1 illustrates a case where a base station apparatus eNodeB and a user terminal UE each have eight antennas.

In the precoding in downlink MIMO transmission in the MIMO system shown in FIG. 1, a mobile terminal apparatus UE measures the amount of channel variation using the received signals from each individual antenna, and, based on the amounts of channel variation measured, selects a PMI (Precoding Matrix Indicator) (precoder) and an RI corresponding to the amount of phase/amplitude control (precoding weight) to maximize the throughput (or received SINR (Signal to Interference and Noise Ratio)) after the transmission data from each individual transmitting antenna of a radio base station apparatus eNodeB is combined. Then, the selected PMI and RI (Rank Indicator) are fed back to the radio base station apparatus eNodeB on the uplink, together with channel quality information, which is, for example, a CQI (Channel Quality Indicator). In the radio base station apparatus eNodeB, transmission data is subjected to precoding based on the PMI and RI that are fed back from the mobile terminal apparatus UE, and information is transmitted from each individual antenna.

In the mobile terminal apparatus UE shown in FIG. 1, the signal demultiplexing/decoding section 11 demultiplexes and decodes the control channel signal and data channel signal included in the received signals that are received via receiving antennas RX #1 to RX #8. The signal demultiplexing/decoding section 11 performs a decoding process, thereby reconstructing the data channel signal for the mobile terminal apparatus UE. The PMI selection section 12 selects a PMI according to the channel state estimated by a channel estimation section (not shown). When this takes place, the PMI selection section 12 selects an optimal PMI from a codebook 13 including a plurality of N known precoding weights, which are defined per rank in both the mobile terminal apparatus UE and the radio base station apparatus eNodeB, and PMIs to be associated with the precoding matrices. The RI selection section 14 selects the RIs according to the channel state estimated by the channel estimation section. These PMIs and RIs are transmitted to the radio base station apparatus eNodeB, as feedback information, together with CQIs (Channel Quality Indicator) as channel quality information.

On the other hand, in the radio base station apparatus eNodeB shown in FIG. 1, the precoding weight generating section 21 generates precoding weights based on the PMIs and RIs that are fed back from the mobile terminal apparatus UE. The precoding multiplying section 22 controls (shifts) the phase/amplitude, for each of transmitting antennas TX #1 to #8, by multiplying the transmission signals having been subjected to parallel conversion in a serial-to-parallel conversion section (S/P) 23 by the precoding weights. By this means, the transmission data having been subjected to the phase/amplitude shifting is transmitted from eight transmitting antennas TX #1 to TX #8.

Figure 2A:
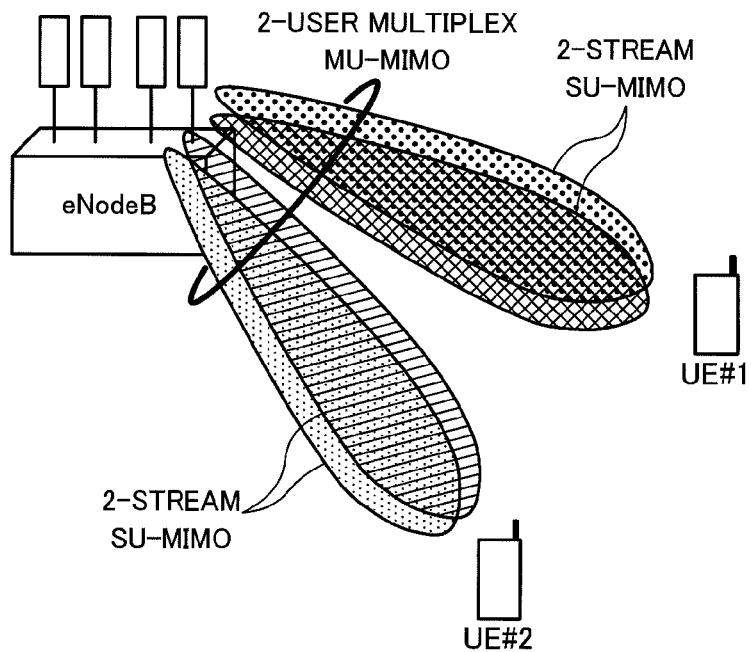
FIG. 2A and FIG. 2B are each a diagram for explaining downlink MIMO transmission in LTE-A.
Figure 2B:
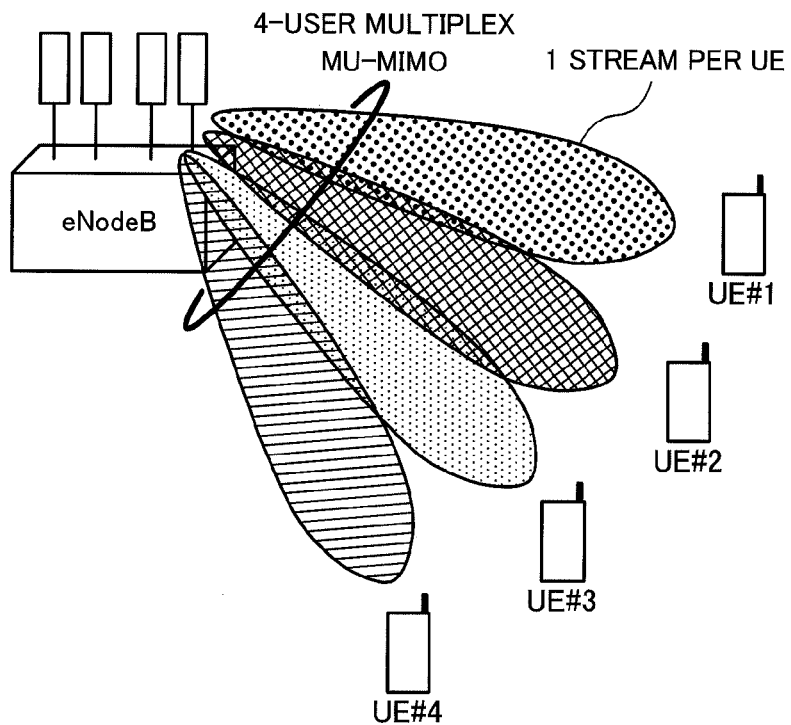

In downlink MU-MIMO transmission in LTE-A, the upper limit of the number of all streams (ranks) is limited to four, and, based on this, there is an agreement to make the number of streams to be multiplexed per user terminal UE two at the maximum and the number of user terminals UEs to be multiplexed four at the maximum. Consequently, in downlink MU-MIMO, as shown in FIG. 2A, an example to transmit two streams to each of mobile terminal apparatuses UE #1 and UE #2 by SU-MIMO transmission, or, as shown in FIG. 2B, an example to transmit one stream to each of UE #1, UE #2, UE #3 and UE #4, is possible.

Figures 3A, 3B:
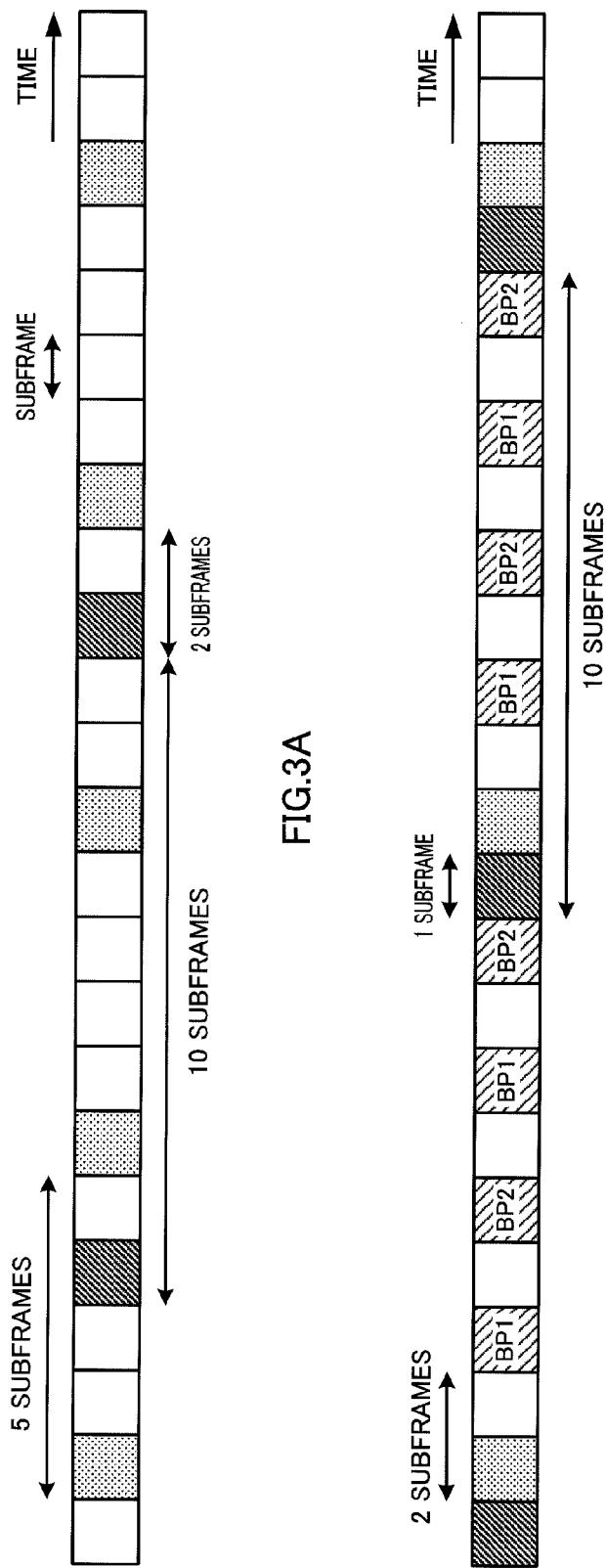
FIG. 3A and FIG. 3B are each a diagram for explaining PMI/CQI/RI feedback using a PUCCH.

Here, in such downlink MIMO transmission, a feedback method of feedback information of channel information (PMI/CQI/RI) from a mobile terminal apparatus to a radio base station apparatus eNodeB will be explained. FIGS. 3A and 3B are diagrams for explaining a method of feeding back feedback information from a mobile terminal apparatus UE to a radio base station apparatus eNodeB through a PUCCH (Physical Uplink Control CHannel) in downlink MIMO transmission. In FIGS. 3A and 3B, cases are illustrated where feedback information is fed back periodically (hereinafter referred to as "periodic feedback").

In periodic feedback, as shown in FIG. 3A, there is a mode to feed back a wideband (WB) CQI and a WB PMI, and an RI in separate subframes, and, as shown in FIG. 3B, there is a mode to feed back a WB CQI and a WB PMI, an RI, and a subband (SB) CQI in separate subframes.

In the mode shown in FIG. 3A, feedback information (PMI/CQI, RI) is fed back using the PUCCH. As shown in FIG. 3A, the WB PMI and the WB CQI, and the RI, are fed back in different subframes (TTIs: Transmission Time Intervals). FIG. 3A illustrates a case where the feedback mode of PUCCH channel information is mode 1-1, the cycle of the WB PMI/WB CQI is five subframes, the cycle of the RI is twice the cycle of the WB PMI/WB CQI (that is, ten subframes), and the subframes in which the RI is fed back is two subframes off-set from the subframes in which the PMI/CQI is fed back. In this case, the PMI/CQI and the RI are encoded and fed back separately.

In the mode shown in FIG. 3B, too, feedback information (PMI/CQI, RI) is fed back using the PUCCH. As shown in FIG. 3B, the WB PMI and the WB CQI, the RI, and the SB CQI are fed back in different subframes (TTIs). FIG. 3B illustrates a case where the feedback mode of PUCCH channel information is mode 2-1, the cycle of the WB PMI/WB CQI is two subframes, the cycle of the RI is five times the cycle of the WB PMI/WB CQI (that is, ten subframes), the subframes in which the RI is fed back is one subframe off-set from the subframes in which the WB PMI/WB CQI are fed back, the number of subbands (bandwidth parts (BPs)) is two, the offset to apply to the subframes in which the subband CQI is fed back from the subframes in which the WB PMI/WB CQI are fed back is two subframes, and the subband CQI of the same subband is fed back twice in the WB PMI/CQI feedback cycle. In this case, the WB PMI/WB CQI, the RI, and the SB CQI are encoded and fed back separately.

Figures 4A, 4B:
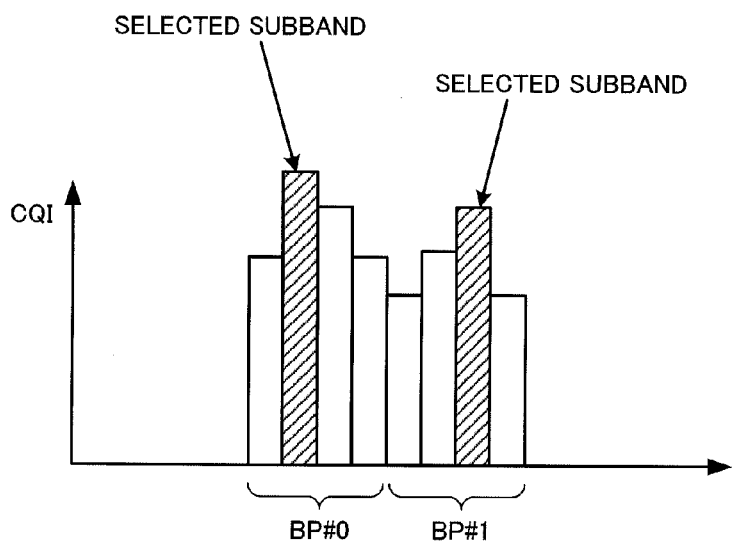
FIG. 4A and FIG. 4B are each a diagram for explaining subband CQI feedback using a PUCCH.

FIG. 4A and FIG. 4B are diagrams for explaining subband CQI feedback using the PUCCH. In the subband CQI feedback using the PUCCH in mode 2-1 (3GPP TS 36.213), in the table shown in FIG. 4A, the system bandwidth (BW) (which is shown in RB (Resource Block) units), the subband size (which is shown in RB units), the number of bandwidth parts (BPs) included in the system bandwidth, the number of subbands (N (RBs)) included in a BP, the number of label bits to show the positions of subbands selected in each BP ($=_N C_m$) (where M (RBs) is the number of subbands having the best quality in the BP), and the total number of CQI bits (=CQI+ the number of label bits) per frequency selective PUCCH report, are associated. In this subband CQI feedback, as shown in FIG. 4B, the subband (the diagonal-line part) to show the highest received SINR in each BP is selected, and the CQI of that subband is fed back. Furthermore, each BP's information is fed back cyclically.

The currently defined feedback by the PUCCH is feedback for selecting the scheduling target (selecting the users to be the subject of scheduling). For example, when the eNodeB schedules ten users where there are actually thirty users under the eNodeB, feedback is sent in the PUCCH in order to select ten users out of the thirty users. Consequently, for feedback designed for such purposes, it is necessary to feed back a PMI that is common throughout the entire band (wide band). However, when only a wideband PMI, which is used for the purpose of user selection, is fed back, it is still not possible to generate precoding weights accurately.

The precoder PMIs to be selected in the mobile terminal apparatus include the precoder (the first PMI) that is selected from the first codebook for a wideband/long cycle, and the precoder (the second PMI) that is selected from the second codebook for a subband/short cycle. Note that the second codebook is for a subband/short cycle, it is also possible to select a wideband second PMI besides the subband second PMI.

The present inventors have focused on the fact that it is essential to feed back a subband PMI and a wideband PMI upon generating precoding weights accurately, and that it is possible to select a subband second PMI and a wideband second PMI together in a second codebook, and arrived at the present invention upon finding out that it is possible to feed back precoders that are essential to generate precoding weights, in downlink MIMO transmission, by selecting a subband second PMI and a wideband second PMI from the second codebook.

That is to say, a gist of the present invention is that, in the first mode to feed back the subband second PMI selected in each bandwidth part through a physical uplink control channel, a subband second PMI and a wideband second PMI are selected from the second codebook, the subband second PMI and the wideband second PMI are multiplexed on subframes, and the multiplex signal is transmitted to a radio base station apparatus through the physical uplink control channel, thereby feeding back precoders that are essential to generate precoding weights, in downlink MIMO transmission.

EXAMPLE 1

In this example, precoders (a wideband second PMI and a subband second PMI) that are selected from one codebook W2 (second codebook) are transmitted and fed back to a radio base station apparatus through a PUCCH.

Figure 5A:
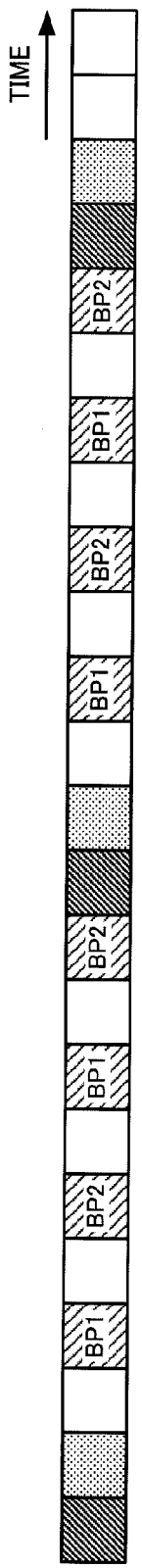
FIG. 5A and FIG. 5B are each a diagram for explaining example 1 in a mobile terminal apparatus according to the present invention.

FIG. 5A is a diagram showing a multiplexing configuration in a mode (the first mode) to feed back the subband second PMI selected in each bandwidth part through the PUCCH. As shown in FIG. 5A, the wideband second PMI and the subband second PMI are multiplexed on different subframes. Also, the wideband second PMI and the wideband CQI are multiplexed on the same subframe, and the subband second PMI and the subband CQI are multiplexed on the same subframe. Also, the RI and the wideband first PMI are multiplexed on the same subframe. Consequently, in this example, the wideband second PMI and the subband second PMI are selected from the second codebook W2 and multiplexed on sub frames.

Figure 5B:
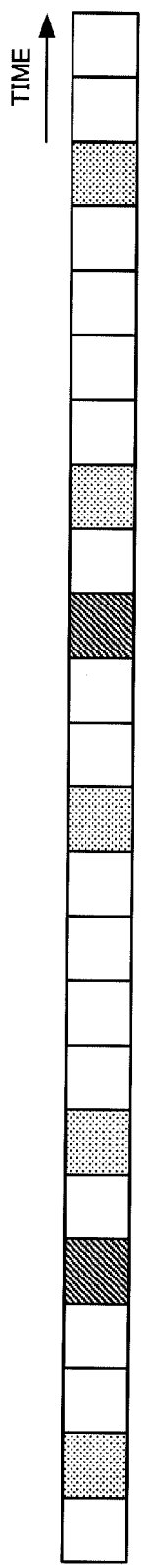

FIG. 5B is a diagram showing a multiplexing configuration in a mode (second mode) to feed back the wideband first PMI and the wideband second PMI through the PUCCH. As shown in FIG. 5B, the wideband CQI and the wideband second PMI are multiplexed on the same subframe, and the RI and wideband first PMI are multiplexed on the same subframe.

When selecting a wideband second PMI and a subb and second PMI from a second codebook W2, after the wideband second PMI is selected first, the subband second PMI is selected. That is to say, in the selection of wideband second PMI, one precoding matrix is selected from the second codebook, and, after that, in the selection of the subband second PMI, an optimal precoding matrix is selected from the subset of the precoding matrix selected in the second codebook. Here, an optimal precoding matrix refers to a matrix that maximizes the received signal power upon forming a precoding beam on the receiving side.

EXAMPLE 2

In this example, precoders (the wideband second PMI and the subband second PMI) selected from one codebook W2 (the second codebook) are transmitted and fed back to a radio base station apparatus through a PUCCH.

FIG. 6A is a diagram showing a multiplexing configuration in a mode (the first mode) to feed back the subband second PMI selected in each bandwidth part through the PUCCH. As shown in FIG. 6A, the wideband second PMI and the subband second PMI are multiplexed on different subframes. Also, the wideband CQI, the wideband first PMI and the wideband second PMI are multiplexed on the same subframe, and the subband second PMI and the subband CQI are multiplexed on the same subframe. Also, the RI is multiplexed on one subframe. Consequently, in this example, too, the wideband second PMI and the subband second PMI are selected from the second codebook W2, and multiplexed on subframes.

FIG. 6B is a diagram showing a multiplexing configuration in a mode (the second mode) to feed back the wideband first PMI and the wideband second PMI through the PUCCH. As shown in FIG. 6B, the wideband CQI, the wideband first PMI and the wideband second PMI are multiplexed on the same subframe, and the RI is multiplexed on one subframe.

In above example 1 and example 2, between the first mode and the second mode, the feedback information to multiplex on subframes other than the subframe on which the subband second PMI is multiplexed in the first mode, is the same. That is to say, as clear from FIG. 5A and FIG. 5B, the feedback information (the wideband second PMI and the wideband CQI, and the RI and the wideband first PMI) to be multiplexed on subframes other than the subframe on which the subband second PMI is multiplexed, is the same between the first mode and the second mode. Also, as clear from FIG. 6A and FIG. 6B, the feedback information (the wideband first PMI, the wideband second PMI, and the wideband CQI and the RI) to be multiplexed on subframes other than the subframe on which the subband second PMI is multiplexed, is the same between the first mode and the second mode. By designing in this way, it is possible to achieve simplification with respect to the standards specifications, implementation, and the operation of PUCCH transmission power control.

In this way, with the present invention, a subband second PMI and a wideband second PMI, selected from a second codebook, are multiplexed on subframes and transmitted to the radio base station apparatus through the PUCCH, so that it is possible to feed back precoders that are essential to generate precoding weights in downlink MIMO transmission. Note that, as long as a configuration is provided in which a subband second PMI and a wideband second PMI selected from a second codebook are multiplexed on subframes and transmitted to the radio base station apparatus through the PUCCH, there is no particular limit as to the combination of feedback information to multiplex on subframes.

Now, an embodiment of the present invention will be described below in detail with reference to the accompanying drawings. Here, a case of using a radio base station apparatus and a mobile terminal apparatus supporting the LTE-A system will be described.

Figure 7:
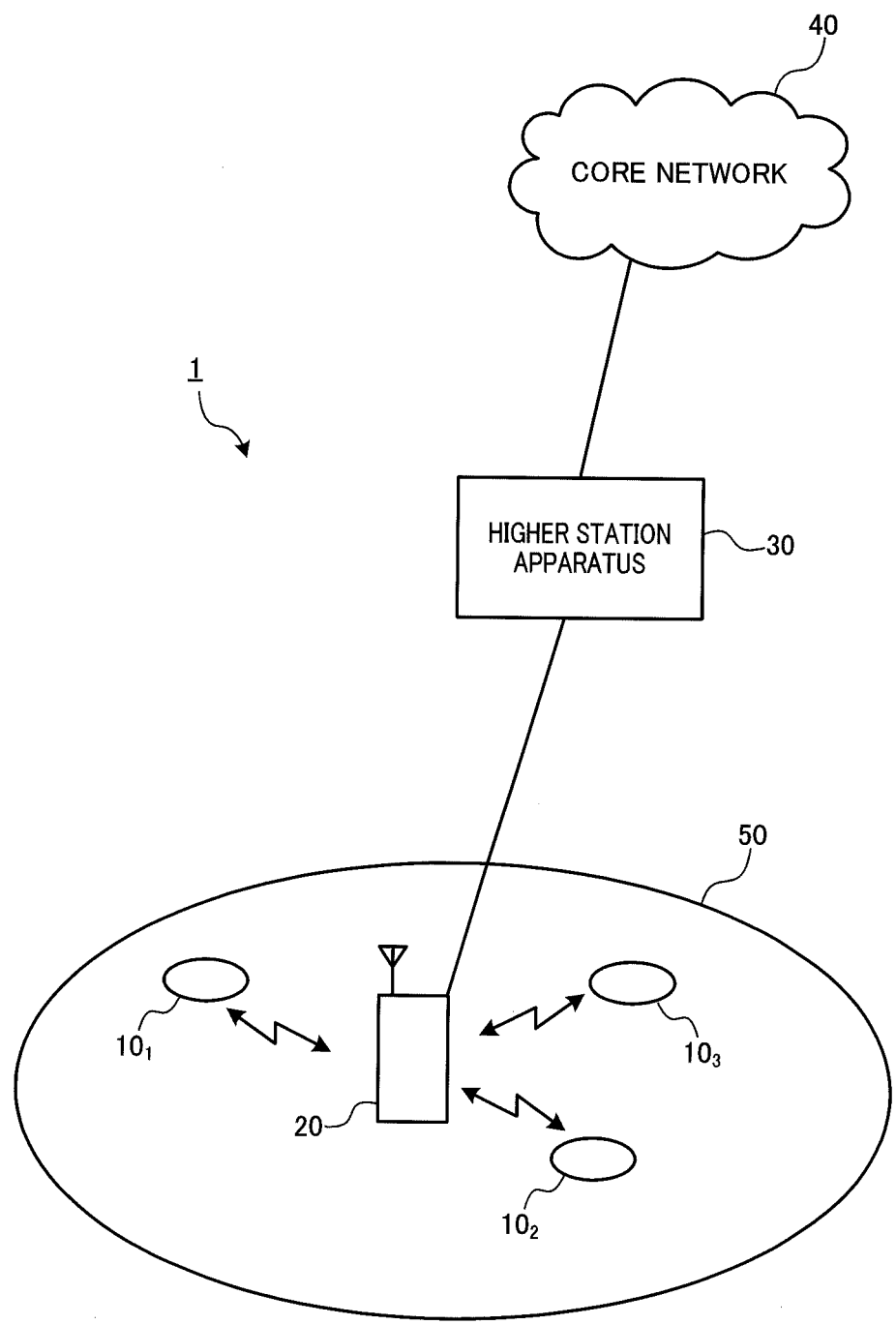
FIG. 7 is a diagram for explaining a configuration of a mobile communication system according to an embodiment of the present invention.

A mobile communication system 1 having a mobile terminal apparatus (UE) 10 and a radio base station apparatus (eNodeB) 20 according to an embodiment of the present invention will be described with reference to FIG. 7. FIG. 7 is a diagram for explaining the configuration of a mobile communication system 1 having a mobile terminal apparatus 10 and a radio base station apparatus 20 according to an embodiment of the present invention. Note that the mobile communication system 1 illustrated in FIG. 7 is a system to incorporate, for example, an LTE system or SUPER 3G. Also, this mobile communication system 1 may be referred to as "IMT-Advanced" or "4G."

As illustrated in FIG. 7, the mobile communication system 1 is configured to include the radio base station apparatus 20 and a plurality of mobile terminal apparatuses 10 ($10_1$, $10_2$, $10_3$, ... $10_n$, where n is an integer to satisfy n>0) that communicate with this radio base station apparatus 20. The radio base station apparatus 20 is connected with a higher station apparatus 30, and this higher station apparatus 30 is connected with a core network 40. The mobile terminal apparatuses 10 communicate with the radio base station apparatus 20 in a cell 50. Note that the higher station apparatus 30 includes, for example, an access gateway apparatus, a radio network controller (RNC), a mobility management entity (MME) and so on, but is by no means limited to these.

The mobile terminal apparatuses ($10_1$, $10_2$, $10_3$, ... $10_n$) have the same configuration, functions and state, so that, the following description will be given with respect to "mobile terminal apparatus 10," unless specified otherwise. Also, although the mobile terminal apparatus 10 performs radio communication with the radio base station apparatus 20 for ease of explanation, more generally, user apparatuses (UE: User Equipment) including mobile terminal apparatuses and fixed terminal apparatuses may be used as well.

In the mobile communication system 1, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Now, communication channels in the LTE system will be described. As for the downlink, a PDSCH that is used by each mobile station 10 on a shared basis, and downlink L1/L2 control channels (PDCCH (Physical Downlink Control CHannel), PCFICH (Physical Control Field Indicator CHannel), and PHICH (Physical Hybrid automatic repeat request Indicator CHannel)) are used. By means of this PDSCH, user data, that is, normal data signals, are transmitted. Transmission data is included in this user data. Note that the component carriers and scheduling information allocated to the mobile terminal apparatus 10 in the radio base station apparatus 20 are reported to the mobile terminal apparatus 10 by the L1/L2 control channels.

On the uplink, a PUSCH (Physical Uplink Shared Channel) that is used by each mobile terminal apparatus 10 on a shared basis, and a PUCCH (Physical Uplink Control Channel), which is an uplink control channel, are used. User data is transmitted by means of this PUSCH. Furthermore, by means of the PUCCH, downlink radio quality information (CQI) and so on are transmitted.

Figure 8:
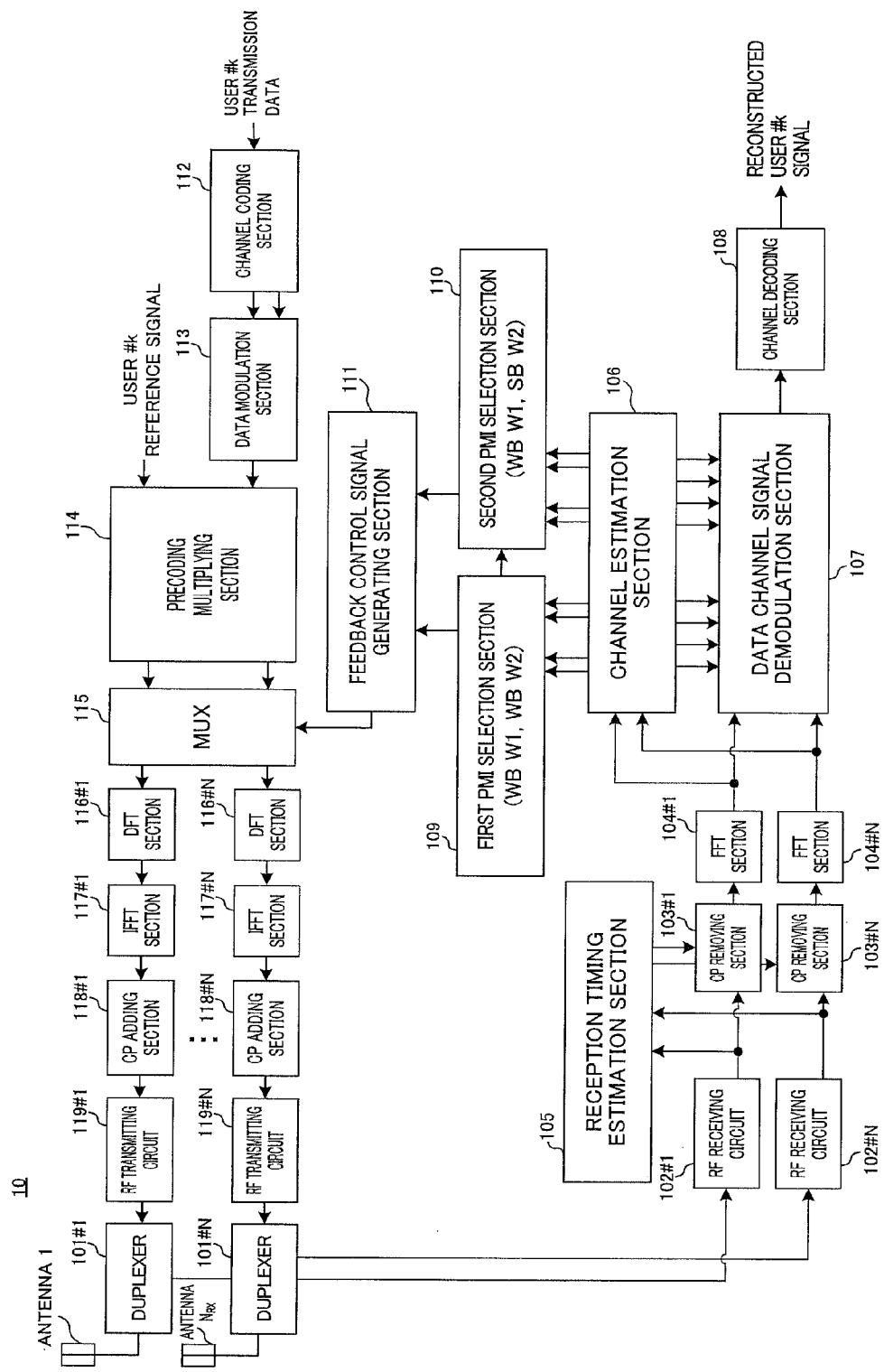
FIG. 8 is a block diagram showing a configuration of the mobile station apparatus according to the above embodiment.
Figure 9:
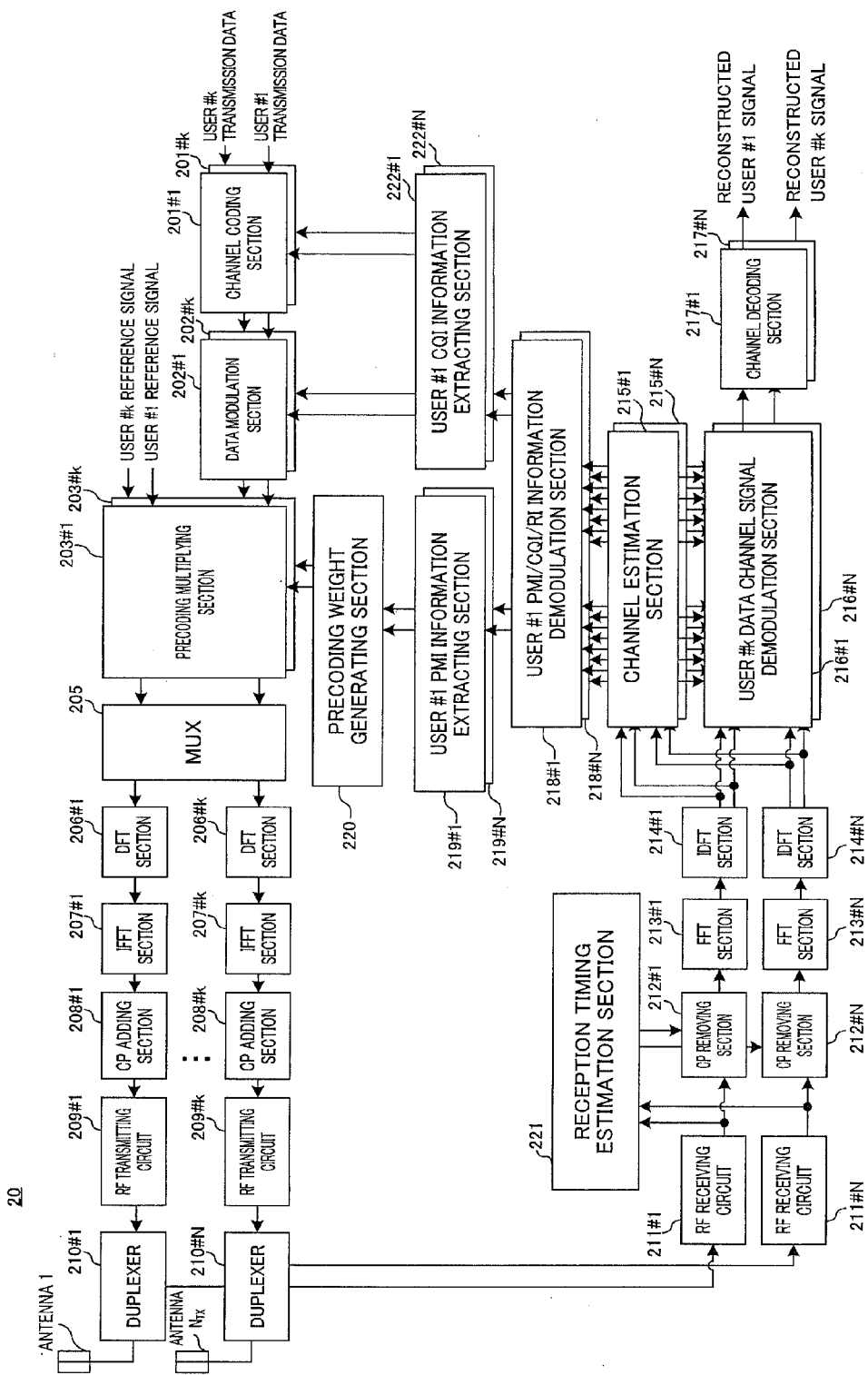
FIG. 9 is a block diagram showing a configuration of a base station apparatus according to the above embodiment.

FIG. 8 is a block diagram showing a configuration of the mobile terminal apparatus 10 according to the present embodiment. FIG. 9 is a block diagram showing a configuration of the base station apparatus 20 according to the present embodiment. Note that, although the mobile terminal apparatus 10 and the radio base station apparatus 20 shown in FIG. 8 and FIG. 9 are simplified to explain the present invention, both have the configurations which a normal radio base station apparatus and a mobile terminal apparatus have.

In the mobile terminal apparatus 10 shown in FIG. 8, transmission signals transmitted from the radio base station apparatus 20 are received by the antennas 1 to $N_{Rx}$, electrically separated into the transmission route and the reception route by duplexers 101 #1 to 101 #N, and then output to RF receiving circuits 102 #1 to 102 #N. Then, after a frequency conversion process for conversion from radio frequency signals into baseband signals is performed in RF receiving circuits 102 #1 to 102 #N, the resulting signals are output to a reception timing estimation section 105 and CP removing sections 103 #1 to 103 #N. The reception timing estimation section 105 estimates the reception timing based on the received signals after the frequency conversion process, and outputs the reception timing to CP removing sections 103 #1 to 103 #N. The CPs (Cyclic Prefixes) are removed in CP removing sections 103 #1 to 103 #N, and, in fast Fourier transform sections (FFT sections) 104 #1 to 104 #N, a Fourier transform is performed to convert the time sequence signals into frequency domain signals. The received signals having been converted into frequency domain signals are output to the channel estimation section 106 and the data channel signal demodulation section 107.

The channel estimation section 106 estimates the channel states from the reference signals included in the received signals output from FFT sections 104 #1 to #N, and reports the estimated channel states to the data channel signal demodulation section 107. The data channel signal demodulation section 107 demodulates the data channel signal based on the reported channel states. The demodulated data channel signal is subjected to channel decoding in the channel decoding section 108 and reconstructed back to a user #k signal.

The first PMI selection section 109 and the second PMI selection section 110 select PMIs from the channel states reported from the channel estimation section 106. Here, the first PMI selection section 109 and the second PMI selection section 110 select feedback information from two codebooks, that is, the first codebook for a wideband/long cycle and a second codebook for a subband/short cycle. The first PMI selection section 109 selects the wideband first PMI from the first codebook and also selects a wideband second PMI from the second codebook. The second PMI selection section 110 selects the wideband first PMI from the first codebook and also selects a subband second PMI from the second codebook.

The first PMI selection section 109 reports the selected wideband first PMI and wideband second PMI to a feedback control signal generating section 111. Also, the first PMI selection section 109 outputs the wideband second PMI (one precoding matrix) to the second PMI selection section 110. The second PMI selection section 110 selects an optimal precoding matrix (the subband second PMI) from the subset of the wideband second PMI (one precoding matrix) from the first PMI selection section 109. The second PMI selection section 110 reports the selected wideband first PMI and subband second PMI to the feedback control signal generating section 111. In this way, the first PMI selection section 109 and the second PMI selection section 110, after having selected the wideband second PMI, selects the subband second PMI.

Also, and RI corresponding to the estimated channel state is selected in the channel estimation section 106, and the selected RI is reported to the feedback control signal generating section 111.

Also, the channel quality (CQI) measurement section (not illustrated) measures channel quality from the channel state reported from the channel estimation section 106. To be more specific, the channel quality measurement section measures a CQI based on the channel state reported from the channel estimation section 106, and reports this CQI to the feedback control signal generating section 111. The channel quality measurement section selects the CQIs corresponding to the wideband first PMI selected from the first codebook W1, the wideband second PMI selected from second codebook W2, and the subband second PMI.

Based on the PMI, the CQI and the RI that are reported, the feedback control signal generating section 111 generates a control signal (for example, a PUCCH signal) to feed back these to the radio base station apparatus 20. Also, the feedback control signal generating section 111 performs channel coding and data modulation of information of the wideband first PMI, the wideband second PMI, the subband second PMI, the wideband CQI, the subband CQI and the RI, for feeding back through the PUCCH. The control signal generated in the feedback control signal generating section 111 and the PMI, the CQI and the RI after the channel coding, are output to the multiplexer (MUX: multiplexing section) 115.

Meanwhile, transmission data #k related to user #k, transmitted from an upper layer, is subjected to channel coding in the channel coding section 112, and then subjected to data modulation in the data modulation section 113. Transmission data #k having been subjected to the data modulation in the data modulation section 113 is subjected to an inverse Fourier transform in a discrete Fourier transform section (not shown) and converted from a time sequence signal to a frequency domain signal, and output to a sub carrier mapping section (not shown).

The subcarrier mapping section maps transmission data #k to subcarriers in accordance with schedule information that is designated from the base station apparatus 20. At this time, the subcarrier mapping section maps (multiplexes) reference signal #k, having been generated in a reference signal generation section (not shown), to subcarriers, with transmission data #k. Transmission data #k mapped to subcarriers in this way is output to a precoding multiplying section 114.

The precoding multiplying section 114 applies phase and/or amplitude shifting to transmission data #k, for each of the receiving antennas 1 to $N_{RX}$, based on the precoding weight corresponding to the PMI. Transmission data #k, having been subjected to the phase and/or amplitude shifting by the precoding multiplying section 114, is output to the multiplexer (MUX) 115.

The multiplexer (MUX) 115 combines transmission data #k, having been subjected to the phase and/or amplitude shifting, and the control signal, having been generated in the feedback control signal generating section 111, and generates a transmission signal for each of the receiving antennas 1 to $N_{RX}$. This mapping (multiplexing) is carried out according to above-described example 1 and example 2. That is to say, the wideband second PMI and the subband second PMI selected from the second codebook are multiplexed on different subframes. Also, the wideband second PMI and the wideband CQI are multiplexed on the same subframe, and the subband second PMI and the subband CQI are multiplexed on the same subframe. Furthermore, between the first mode and the second mode, the feedback information to multiplex on subframes other than the subframe on which the subband second PMI is multiplexed in the first mode is the same.

The transmission signals generated by the multiplexer (MUX) 115 are subjected to a discrete Fourier transform in discrete Fourier transform sections (DFT sections) 116 #1 to 116 #N, and converted from time sequence signals to frequency domain signals. The frequency domain signals are allocated to a frequency band that is orthogonal to other UEs by subcarrier mapping (not shown). After that, an inverse fast Fourier transform is performed in inverse fast Fourier transform sections (IFFT sections) 117 #1 to 117 #N, the frequency domain signals are converted into time domain signals, and, after that, CP adding sections 118 #1 to 118 #N attach CPs and outputs the resulting signals to RF transmitting circuits 119 #1 to 119 #N.

RF transmitting circuits 119 #1 to 119 #N perform a frequency conversion process for conversion into a radio frequency band, and, after that, output the resulting signals to the antenna 1 to the antenna $N_{RX}$, via duplexers 101 #1 to 101 #N, and transmit the signals from the antenna 1 to the antenna $N_{RX}$, to the radio base station apparatus 20, on the uplink. Note that these RF transmitting circuits 119 #1 to 119 #N, duplexers 101 #1 to 101 #N, and the antenna 1 to the antenna $N_{RX}$ constitute a transmitting means to transmit control signals.

Meanwhile, the radio base station apparatus 20 shown in FIG. 9 transmits transmission data #1 to #k corresponding to users #1 to #k, to corresponding channel coding sections 201 #1 to 201 #k. Transmission data #1 to #k are subjected to channel coding in channel coding sections 201 #1 to 201 #k, and, after that, output to data modulation sections 202 #1 to 202 #k and subjected to data modulation. Transmission data #1 to #k having been subjected to the data modulation in data modulation section 202 #1 to 202 #k are subjected to an inverse discrete Fourier transform in a discrete Fourier transform section (not shown) and converted from time sequence signals to frequency domain signals, and output to precoding multiplying sections 203 #1 to 203 #k.

Based on the precoding weight given from a precoding weight generating section 220, which will be described later, precoding multiplying sections 203 #1 to 203 #k apply phase and/or amplitude shifting (that is, assigns weight to the antennas 1 to $N_{TX}$ by way of precoding) to transmission data #1 to #k for each of the antennas 1 to $N_{TX}$. Transmission data #1 to #k, having been subjected to the phase and/or amplitude shifting by precoding multiplying section 203 #1 to 203 #k, are output to the multiplexer (MUX) 205.

The multiplexer (MUX) 205 generates a transmission signal for each of the transmitting antennas 1 to $N_{TX}$ with respect to transmission data #1 to #k having been subjected to the phase and/or amplitude shifting. The transmission signals generated by the multiplexer (MUX) 205 are subjected to a discrete Fourier transform in the discrete Fourier transform section (DFT section) 206 #1 to 206 #k and converted from time sequence signal into frequency domain signals. After that, an inverse fast Fourier transform is performed in inverse fast Fourier transform sections (IFFT sections) 207 #1 to 207 #k, the frequency domain signals are converted into time domain signals, and, after that, CP adding sections 208 #1 to 208 #k attach CPs and outputs the resulting signals to RF transmitting circuits 209 #1 to 209 #k.

RF transmitting circuits 209 #1 to 209 #N perform a frequency conversion process for conversion into a radio frequency band, and, after that, output the resulting signals to the antenna 1 to the antenna $N_{Rx}$, via duplexers 210 #1 to 210 #N, and transmit the signals from the antenna 1 to the antenna $N_{Rx}$, to the mobile terminal apparatus 10, on the downlink. Note that these RF transmitting circuits 209 #1 to 209 #k, duplexers 210 #1 to 210 #N, and the antenna 1 to the antenna $N_{RX}$ constitute a transmitting means to transmit control signals.

The transmission signals transmitted from the mobile terminal apparatus 10 are received by the antennas 1 to $N_{Rx}$, electrically separated into the transmission route and the reception route by duplexers 210 #1 to 210 #N, and then output to RF receiving circuits 211 #1 to 211 #N. Then, after a frequency conversion process for conversion from radio frequency signals into baseband signals is performed in RF receiving circuits 211 #1 to 211 #N, the resulting signals are output to a reception timing estimation section 221 and CP removing sections 212 #1 to 212 #N. The reception timing estimation section 221 estimates the reception timing based on the received signals after the frequency conversion process, and outputs the reception timing to CP removing sections 212 #1 to 212 #N.

CP removing sections 212 #1 to 212 #N remove the CPs, and the fast Fourier transform sections (FFT sections) 213 #1 to 213 #N perform a Fourier transform and convert the time sequence signals into frequency domain signals. After that, inverse discrete Fourier transform sections (IDFT sections) 214 #1 to 214 #N perform an inverse discrete Fourier transform and convert the frequency domain signals into time domain signals. The received signals having been converted into time domain signals are output to channel estimation sections 215 #1 to 215 #N and data channel signal demodulation sections 216 #1 to 216 #N.

Channel estimation sections 215 #1 to 215 #N estimate the channel states from reference signals included in the received signals output from IDFT sections 214 #1 to 214 #N, and report the estimated channel states to data channel signal demodulation sections 216 #1 to 216 #N. Data channel signal demodulation section 216 #1 to 216 #N demodulate the data channel signals based on the reported channel states. The demodulated data channel signals are subjected to channel decoding in channel decoding sections 217 #1 to 217 #N and reconstructed back to signals for users #1 to #k. Note that the antennas 1 to $N_{Tx}$, duplexers 210 #1 to 210 #N, and RF receiving circuits 211 #1 to 211 #N constitute a receiving means to receive control signals.

From the information included in each control channel signal (for example, the PUCCH), PMI/CQI/RI information demodulation sections 218 #1 to 218 #N demoudalte channel-related information—for example, feedback information such as the CQI, the PMI and the RI reported by the PDCCH. The information demodulated by PMI/CQI/RI information demodulation sections 218 #1 to 218 #N is output to CQI information extracting sections 222 #1 to 222 #N and PMI information extracting section 219 #1 to 219 #N.

CQI information extracting sections 222 #1 to 222 #N extract CQI information from the information demodulated by PMI/CQI/RI information demodulation sections 218 #1 to 218 #N. The extracted CQIs are output to data modulation sections 202 #1 to 202 #k and channel coding section 201 #1 to 201 #k.

PMI information extracting section 219 #1 to 219 #N extract PMI information from the information demodulated by PMI/CQI/RI information demodulation sections 218 #1 to 218 #N. Here, the PMI information refers to the wideband first PMI selected from the first codebook W1, and the wideband second PMI and subband second PMI selected from the second codebook W2. The PMI-extracted wideband first PMI, wideband second PMI and subband second PMI are output to the precoding weight generating section 220.

The precoding weight generating section 220 constitutes a weight generating means, and generates precoding weights which represent the amount of phase and/or amplitude shifting to apply to transmission data #1 to #k, based on the wideband first PMI, the wideband second PMI and the subband second PMI that are output from PMI information extracting section 219 #1 to 219 #N, and the RI. The generated precoding weights are output to precoding multiplying sections 207 #1 to 207 #k, and used in the precoding of transmission data #1 to transmission data #k. In the precoding weight generating section 220, it is preferable to generate precoding weights using the most recently fed-back wideband second PMI and subband second PMI. By this means, it is possible to reduce the influence of deterioration of response of precoding weights due to delayed control.

With the mobile terminal apparatus 10 and the radio base station apparatus 20 having such configurations, the mobile terminal apparatus 10, in the first mode to feed back the subband second PMI selected in each bandwidth part through a physical uplink control channel, multiplexes a subband second PMI and a wideband second PMI selected from a second codebook, and transmits the multiplexed signal to the radio base station apparatus 20 through a PUCCH, and the radio base station apparatus 20 generates a precoding weight using the wideband second PMI and the subband second PMI, and, by forming a beam using that precoding weight, transmits a downlink signal to the mobile terminal apparatus 10 by transmission diversity. By this means, it is possible to generate precoders that are essential to generate precoding weights in downlink MIMO transmission.

Now, although the present invention has been described in detail with reference to the above embodiments, it should be obvious to a person skilled in the art that the present invention is by no means limited to the embodiments described in this specification. The present invention can be implemented with various corrections and in various modifications, without departing from the spirit and scope of the present invention defined by the recitations of the claims. Consequently, the descriptions in this specification are provided only for the purpose of explaining examples, and should by no means be construed to limit the present invention in any way.

The disclosure of Japanese Patent Application No. 2010-181789, filed on Aug. 16, 2010, including the specification, drawings and abstract, is incorporated herein by reference in its entirety.

The invention claimed is:

1. A mobile terminal apparatus comprising:
 a PMI selection section configured to, in a first mode to feed back a subband second PMI that is selected in each bandwidth part, through a physical uplink control channel, select the subband second PMI and a wideband second PMI from a second codebook; and
 a transmission section configured to transmit the subband second PMI and the wideband second PMI to a radio base station apparatus through the physical uplink control channel.

2. The mobile terminal apparatus according to claim 1, wherein,
 the PMI selection section is configured to select one precoding matrix from the second codebook in selection of the wideband second PMI, and select an optimal precoding matrix from a subset of the precoding matrix selected in the second codebook in selection of the subband second PMI.

3. The mobile terminal apparatus according to claim 2, wherein the transmission section is configured to transmit the subband second PMI and the wideband second PMI on different subframes.

4. The mobile terminal apparatus according to claim 1, wherein the transmission section is configured to transmit the subband second PMI and the wideband second PMI on different subframes.

5. The mobile terminal apparatus according to claim 1, wherein the transmission section is configured to transmit the wideband second PMI and a wideband CQI on a same subframe and transmit the subband second PMI and a subband CQI on a same subframe.

6. The mobile terminal apparatus according to claim 1, wherein, between a second mode to feed back a wideband first PMI and the wideband second PMI through the physical uplink control channel, and the first mode, feedback information to transmit on subframes other than the subframe on which the subband second PMI is transmitted in the first mode is the same.

7. A radio communication method comprising the steps of:
 at a mobile terminal apparatus:
  in a first mode to feed back a subband second PMI that is selected in each bandwidth part, through a physical uplink control channel, selecting the subband second PMI and a wideband second PMI from a second codebook; and
  transmitting the subband second PMI and the wideband second PMI to a radio base station apparatus through the physical uplink control channel; and
 at the radio base station apparatus:
 receiving the wideband second PMI and the subband second PMI;
 generating a precoding weight using the wideband second PMI and the subband second PMI; and
 forming a beam using the precoding weight and transmitting a downlink signal to the mobile terminal apparatus.

8. The radio communication method according to claim 7, wherein, in selection of the wideband second PMI, one precoding matrix is selected from the second codebook, and, in selection of the subband second PMI, an optimal precoding matrix is selected from a subset of the precoding matrix selected in the second codebook.

9. The radio communication method according to claim 8, wherein the mobile terminal apparatus transmits the subband second PMI and the wideband second PMI on different subframes.

10. The radio communication method according to claim 7, wherein the mobile terminal apparatus transmits the subband second PMI and the wideband second PMI on different subframes.

11. The radio communication method according to claim 7, wherein the mobile terminal apparatus transmits the wideband second PMI and a wideband CQI on a same subframe and multiplexes the subband second PMI and a subband CQI on a same subframe.

12. The radio communication method according to claim 7, wherein, between a second mode to feed back a wideband first PMI and the wideband second PMI through the physical uplink control channel, and the first mode, feedback information to transmit on subframes other than the subframe on which the subband second PMI is transmitted in the first mode is the same.

13. The radio communication method according to claim 7, wherein the radio base station apparatus generates the precoding weight using a most recently fed-back wideband second PMI and subband second PMI.

* * * * *